(12) United States Patent
George et al.

(10) Patent No.: US 12,445,612 B2
(45) Date of Patent: Oct. 14, 2025

(54) METHODS AND SYSTEMS FOR COMPRESSING VIDEO DATA

(71) Applicant: Honeywell International Inc., Charlotte, NC (US)

(72) Inventors: Eldhose K. George, Kerala (IN); Jitendra S. Chaurasia, Bengaluru (IN); Indranil Datta, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 107 days.

(21) Appl. No.: 18/296,797

(22) Filed: Apr. 6, 2023

(65) Prior Publication Data
US 2024/0340422 A1 Oct. 10, 2024

(51) Int. Cl.
| | |
|---|---|
| H04N 19/124 | (2014.01) |
| H04N 19/172 | (2014.01) |
| H04N 19/177 | (2014.01) |
| H04N 19/60 | (2014.01) |

(52) U.S. Cl.
CPC ......... *H04N 19/124* (2014.11); *H04N 19/172* (2014.11); *H04N 19/177* (2014.11); *H04N 19/60* (2014.11)

(58) Field of Classification Search
None
See application file for complete search history.

(56) References Cited

U.S. PATENT DOCUMENTS

| | | | | |
|---|---|---|---|---|
| 6,298,145 B1 * | 10/2001 | Zhang | ................. | G06V 40/161 |
| | | | | 348/169 |
| 8,849,044 B2 | 9/2014 | Ren et al. | | |
| 10,701,394 B1 * | 6/2020 | Caballero | .............. | G06N 3/045 |
| 11,544,881 B1 * | 1/2023 | Finlay | ...................... | G06N 3/08 |
| 2002/0041703 A1 * | 4/2002 | Fox | ....................... | H04N 19/597 |
| | | | | 348/E13.071 |
| 2003/0021472 A1 * | 1/2003 | Nichogi | ............... | H04N 19/186 |
| | | | | 375/E7.181 |

(Continued)

FOREIGN PATENT DOCUMENTS

| | | |
|---|---|---|
| CN | 113536939 A | 10/2021 |
| CN | 114332745 B | 5/2022 |
| WO | 2009150425 A2 | 12/2009 |

OTHER PUBLICATIONS

Chakraborty, "Deploy Your Apps to a Supercloud in a Few Clicks", https://www.section.io/engineering-education/image-compression-using-pca/, 22 pages, Accessed Mar. 2023.

(Continued)

*Primary Examiner* — Stefan Gadomski
(74) *Attorney, Agent, or Firm* — Seager, Tufte & Wickhem, LLP

(57) ABSTRACT

A method for compressing a video stream includes retrieving a plurality of frames corresponding to the video stream. For each of two or more sequential frames of the plurality of frames of the video stream, the method includes extracting Key Point Descriptors (KPDs) for the respective frame and processing the respective frame using Principle Component Analysis (PCA) followed by vector quantization, resulting in a quantized explained variance matrix for the respective frame. The quantized explained variance matrix for the respective frame is stored. The KPDs for the respective frame are stored.

18 Claims, 12 Drawing Sheets

(56) References Cited

U.S. PATENT DOCUMENTS

| | | | | |
|---|---|---|---|---|
| 2012/0327243 | A1* | 12/2012 | Rezvani | H04W 4/14 |
| | | | | 348/E5.093 |
| 2014/0270541 | A1* | 9/2014 | Lee | G06V 10/464 |
| | | | | 382/201 |
| 2014/0310314 | A1* | 10/2014 | Li | G06F 16/583 |
| | | | | 707/780 |
| 2015/0100609 | A1* | 4/2015 | Blanc | H03M 7/70 |
| | | | | 708/203 |
| 2015/0130953 | A1* | 5/2015 | Mansour | H04N 23/683 |
| | | | | 348/208.1 |
| 2018/0139458 | A1* | 5/2018 | Wang | G06T 3/4053 |
| 2018/0199052 | A1* | 7/2018 | He | H04N 19/52 |
| 2018/0332282 | A1* | 11/2018 | He | H04N 19/11 |
| 2020/0175258 | A1* | 6/2020 | Kang | G06V 40/166 |
| 2020/0219275 | A1* | 7/2020 | Cai | G06T 7/10 |
| 2020/0296362 | A1* | 9/2020 | Chadwick | H04N 19/149 |
| 2021/0312215 | A1* | 10/2021 | Zheng | G06V 30/416 |
| 2021/0326381 | A1 | 10/2021 | Janakiraman et al. | |
| 2022/0121884 | A1* | 4/2022 | Zadeh | G06N 3/006 |
| 2023/0011518 | A1* | 1/2023 | Chadwick | H04L 65/80 |
| 2023/0119685 | A1* | 4/2023 | Kim | H04N 19/139 |
| | | | | 382/103 |
| 2023/0232026 | A1* | 7/2023 | Kim | G06V 10/761 |
| 2024/0296649 | A1* | 9/2024 | Kim | G06N 3/08 |

OTHER PUBLICATIONS

Cheng, "Principal Component Analysis (PCA) Explained Visually with Zero Math", https://towardsdatascience.com/principal-component-analysis-pca-explained-visually-with-zero-math-1cbf392b9e7d, 29 pages, Accessed Mar. 2023.

Enjoy Algorithms, "Image Compression Using Principal Component Analysis (PCA)", https://www.enjoyalgorithms.com/blog/image-compression-using-pca, 15 pages, Accessed Mar. 2023.

Gayathri et al., "Analyzing Global Feature for Duplicate Video Retrieval using CNN and PCA", International Journal of Innovative Technology and Exploring Engineering (IJITEE) ISSN: 2278-3075, vol. 9 Issue-4S2, 6 pages, Mar. 2020.

Moffarreh-Bonab et al., "Adaptive Video Compression using PCA Method", International Journal of Computer Applications (0975-8887), vol. 44-No. 21, 6 pages, Apr. 2012.

P S et al., "Video Copy Detection Using F-Sift and Graph Based Video Sequence Matching", International Journal of Computer Science and Information Technologies, vol. 6 (1), 152-158, 7 pages, 2015.

Sarkar et al., "Efficient and Robust Detection of Duplicate Videos in a Large Database", IEEE Transactions on Circuits and Systems for Video Technology, 29 pages, 2023.

V.B. et al., "Significance of Dimensionality Reduction in Image Processing", Signal & Image Processing: An International Journal (SIPIJ) vol. 6, No. 3, 16 pages, Jun. 2015.

Varoquaux et al., "Vector Quantization Example", https://scikit-learn.org/stable/auto_examples/cluster/blot_face_compress.html, 5 pages, Accessed Mar. 2023.

Wikipedia, "Principal Component Analysis", https://en.wikipedia.org/wiki/Principal_component_analysis, 33 pages, Accessed Jan. 2023.

Wikipedia, "Scale-Invariant Feature Transform", https://en.wikipedia.org/wiki/Scale-invariant_feature_transform, 18 pages, Accessed Jan. 2023.

Wikipedia, Singular Value Decomposition, https://en.wikipedia.org/wiki/Singular_value_decomposition, 16 pages, Accessed Jan. 2023.

Wikipedia, "Vector Quantization", https://en.wikipedia.org/wiki/Vector_quantization, 5 pages, Accessed Mar. 2023.

"Image Compression Using Principal Component Analysis (PCA)", SECT, https://www.section.io/engineering-education/image-compression-using-pca/, 22 Pages, Published Aug. 30, 2021, Accessed Mar. 22, 2023.

Lim, S.T., et al., Medical Image Compression Using Block-based PCA Algorithm, 2014 IEEE 2014 International Conference on Computer, Communication, and Control Technology (I4CT 2014), Sep. 2-4, 2014 (5 pages).

Cu, Zhouye, et al., Low-Complexity Video Coding Based on Two-Dimensional Singular Value Decomposition, IEEE Transactions on Image Processing, vol. 21, No. 2, Feb. 2012 (14 pages).

Extended European Search Report, EP Application No. 24162921.1, European Patent Office, Sep. 18, 2024 (9 pages).

* cited by examiner

METHODS AND SYSTEMS FOR COMPRESSING VIDEO DATA

TECHNICAL FIELD

The present disclosure relates generally to processing of video data. More particularly, the present disclosure relates to methods and systems for compressing video data to reduce the size of the video data.

BACKGROUND

A number of video recording systems store video streams that are provided by a variety of video cameras that are installed or otherwise arranged around a surveillance area such as a city, a portion of a city, a facility or a building. Recording all video streams with high video quality settings can consume substantial storage space and/or communication bandwidth of a video recording system, particularly when there are numerous video cameras. Recording all video at reduced video quality settings can save storage space and/or communication bandwidth, but the resulting video may not be of sufficient quality to meet user needs. What would be desirable are methods and systems for reducing the storage space and/or communication bandwidth requirements of video streams while maintaining sufficient video quality to meet user needs.

SUMMARY

The present disclosure relates to processing of video data. More particularly, the present disclosure relates to methods and systems for compressing video data to reduce the size of the video data. An example may be found in a method for compressing a video stream. The illustrative method includes retrieving a plurality of frames corresponding to the video stream. For each of two or more sequential frames of the plurality of frames of the video stream, the method includes extracting Key Point Descriptors (KPDs) for the respective frame and processing the respective frame using Principle Component Analysis (PCA) followed by vector quantization, resulting in a quantized explained variance matrix for the respective frame. The quantized explained variance matrix for the respective frame is stored. The quantized explained variance matrix represents the respective frame with reduced dimensions. The KPDs for the respective frame are also stored.

Another example may be found in a method of decoding each of the two or more sequential frames of the plurality of frames. For each of two or more sequential frames, the method includes retrieving the quantized explained variance matrix for the respective frame and the KPDs for the respective frame, performing an inverse PCA transform to the quantized explained variance matrix of the respective frame to produce a respective reconstructed frame, merging the KPDs associated with the respective frame with the respective reconstructed frame, and assembling the reconstructed frames for the two or more sequential frames into a decoded video sequence.

Another example may be found in a method for compressing a video stream. The method includes receiving a video stream having a plurality of frames, wherein two or more sequential frames of the plurality of frames are associated with a Group of Pictures (GOP) that includes an I-Frame and one or more P-Frames. Key Point Descriptors (KPDs) are extracted for each of the two or more sequential frames of the GOP. A mean frame for the GOP is determined from the two or more sequential frames of the GOP. The mean frame is subtracted from each of the two or more sequential frames of the GOP, resulting in two or more mean subtracted frames (MSF) for the GOP. The method further includes, for each of the mean subtracted frames (MSF) of the GOP, processing the respective frame using Principle Component Analysis (PCA), resulting in an explained variance matrix for the respective frame, wherein the explained variance matrix represents the respective frame with reduced dimensions. The method includes storing the explained variance matrix for the respective frame and storing the KPDs for the respective frame.

Another example may be found in a method for compressing a video stream. The method includes receiving a plurality of frames corresponding to the video stream, wherein two or more sequential frames of the plurality of frames are associated with a Group of Pictures (GOP) that includes an I-Frame and one or more P-Frames. Key Point Descriptors (KPDs) are extracted for each of the two or more sequential frames of the GOP and are stored for each of the two or more sequential frames of the GOP. A mean frame for the GOP is determined from the two or more sequential frames of the GOP. The mean frame is stored. Each of the two or more sequential frames of the GOP are subtracted from the mean frame, resulting in two or more mean subtracted frames (MSF) for the GOP. For each of the mean subtracted frames of the GOP, the method includes dividing the respective frame into a plurality of blocks of pixels. For each of the blocks, the method includes processing the respective block using Principle Component Analysis (PCA), resulting in an explained variance matrix for the respective block, wherein the explained variance matrix represents the respective block with reduced dimensions, and storing the explained variance matrix for the respective block.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
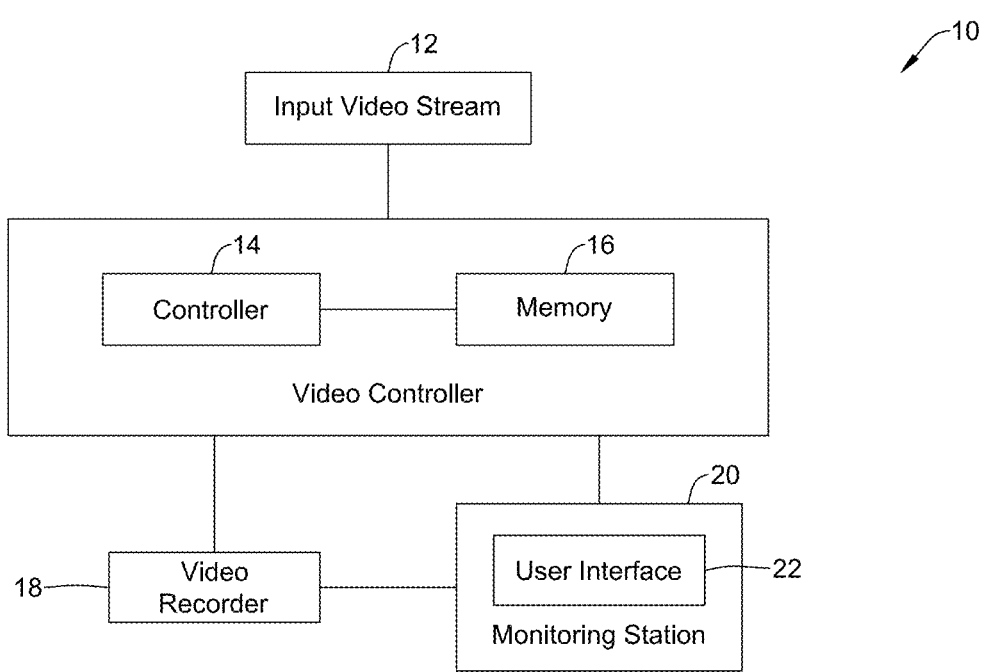
FIG. 1 is a schematic block diagram showing an illustrative video system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video controller 10. The illustrative video controller 10 may be configured to receive an input video stream 12 that encompasses a Field of View (FOV). The input video stream 12 may be received by the video controller 10 via a network connection between the video controller 10 and the source of the input video stream 12. The network connection may include a coaxial or CAT5 cable. The network connection may include a wireless network. In some instances, the input video stream 12 may be received directly from a video camera. In other cases, the input video stream 12 may have been temporarily recorded before being provided to the video controller 10 for processing.

The illustrative video controller 10 includes a controller 14 and a memory 16 that is operably coupled with the controller 14. In some instances, the memory 16 may be used to store at least a portion of a video stream or a video clip that the controller 14 is processing. In some instances, the memory 16 may be used to store one or more algorithms that the controller 14 may utilize when processing the input video stream 12. The controller 14 may be configured to utilize one or more algorithms that are stored within the memory 16 for processing the input video stream 12. In some instances, these algorithms may include video compression algorithms that allow the input video stream 12 or a portion thereof to be compressed such that the input video stream 12 or a portion thereof requires less storage space and/or less communication bandwidth, while retaining sufficient details regarding important parts of the input video stream 12 or a portion thereof to reproduce a representation of the original input video stream 12 or a portion thereof when decoded (e.g. uncompressed).

In the example shown, the video controller 10 is operably coupled with a video recorder 18. In some instances, the input video stream 12 may be recorded in its entirety to the video recorder 18. In some instances, a compressed version of the input video stream 12 may be recorded to the video recorder 18, where the compressed version of the input video stream 12 may be a result of the controller 14 executing one or more algorithms to create the compressed version of the input video stream 12.

In the example shown, the video controller 10 is operably coupled with a monitoring station 20. In some instances, the monitoring station 20 may include a user interface 22. The user interface 22 may be configured to display video streams for viewing by a person using the monitoring station 20, such as the input video stream 12 and/or recorded video streams. The user interface 22 may include one or more of a keyboard, a mouse, a track pad and the like that allows the person using the monitoring station 20 to enter information for use by the video controller 10. In some instances, for example, the person may enter selections for various video parameters that the controller 14 may utilize in running various video compression algorithms on the input video stream 12.

Figure 2:
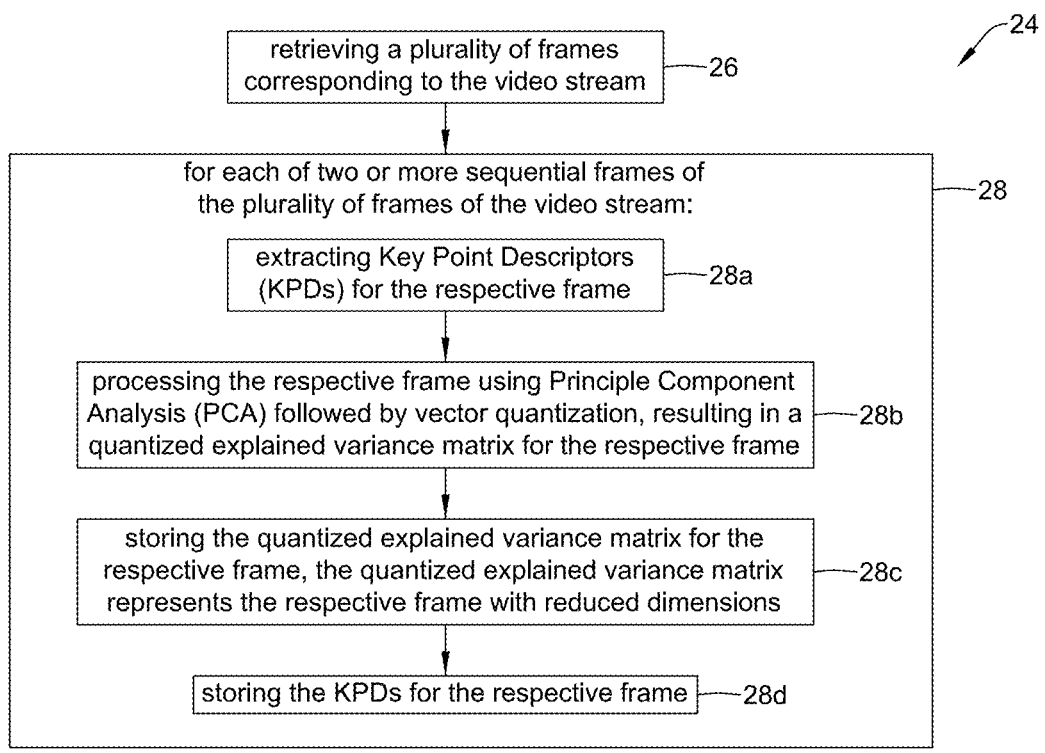
FIG. 2 is a flow diagram showing an illustrative method of compressing a video stream.

FIG. 2 is a flow diagram showing an illustrative method 24 for compressing a video stream (such as the input video stream 12). The illustrative method 24 includes retrieving a plurality of video frames corresponding to the video stream, as indicated at block 26. In some instances, each of the plurality of frames may correspond to a mean subtracted frame (MSF), wherein the mean subtracted frame (MSF) represents an original video frame of the video stream with a mean value subtracted from each pixel of the original frame.

For each of two or more sequential frames of the plurality of frames of the video stream, a number of steps are carried out, as indicated at block 28. The number of steps include extracting Key Point Descriptors for the respective frame, as indicated at block 28a. In some instances, the two or more sequential frames may include a Group of Pictures (GOP) that includes an I-Frame and one or more P-Frames. In some instances, the method 24 includes extracting the Key Point Descriptors (KPDs) for each of the I-Frame and each of the P-Frames of the GOP.

In some instances, the number of steps include processing the respective frame using Principle Component Analysis (PCA) followed by vector quantization, resulting in a quantized explained variance matrix for the respective frame, as indicated at block 28b. In some instances, the method 24 may include processing each of the I-Frame and each of the P-Frames of the GOP using Principle Component Analysis (PCA) followed by vector quantization, resulting in a quantized explained variance matrix for the respective frame. In some instances, the respective frame may be processed using Principle Component Analysis (PCA) to produce an intermediate explained variance matrix, followed by processing the intermediate explained variance matrix using vector quantization to produce the quantized explained variance matrix for the frame.

The number of steps include storing the quantized explained variance matrix for the respective frame. The quantized explained variance matrix represents the respective frame with reduced dimensions, as indicated at block 28c. The number of steps include storing the KPDs for the respective frame, as indicated at block 28d.

Figure 3:
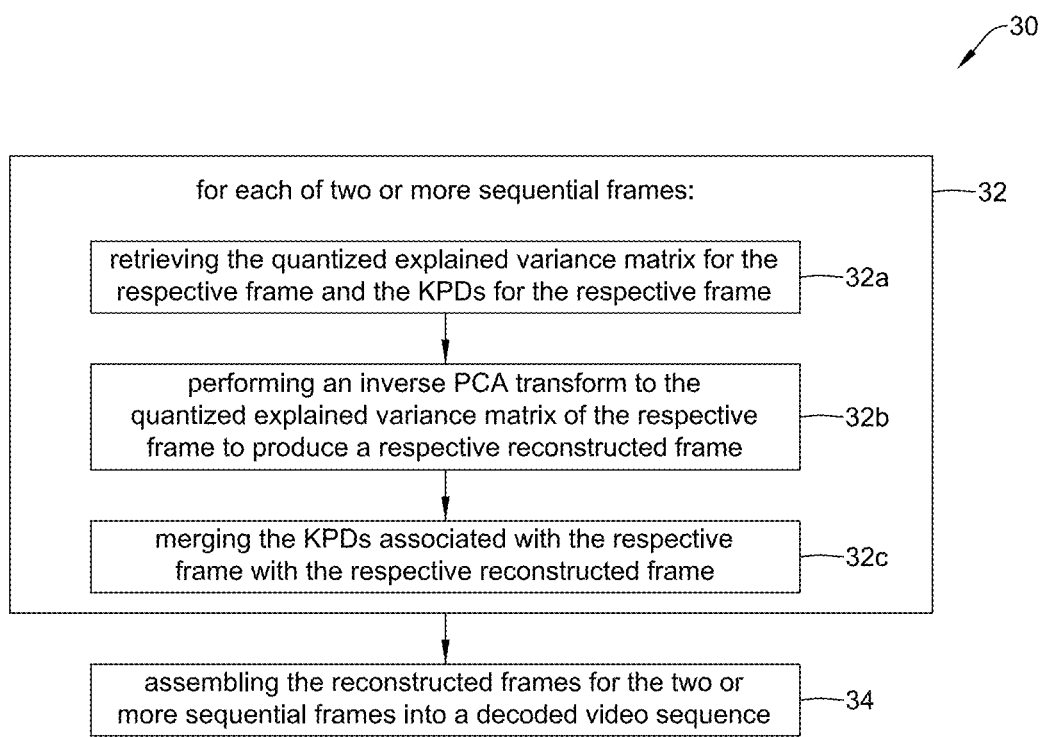
FIG. 3 is a flow diagram showing an illustrative method of compressing a video stream.

In some instances, there may be a desire to regain the original video, or as close as possible to the original video. FIG. 3 is a flow diagram showing an illustrative method 30 for decoding (e.g. uncompressing) each of the two or more sequential frames of the plurality of frames. For each of two or more sequential frames, a number of steps are carried out, as indicated at block 32. The number of steps include retrieving the quantized explained variance matrix for the respective frame and the KPDs for the respective frame, as indicated at block 32a. The number of steps include performing an inverse PCA transform to the quantized explained variance matrix of the respective frame to produce a respective reconstructed frame, as indicated at block 32b. The number of steps include merging the KPDs associated with the respective frame with the respective reconstructed frame, as indicated at block 32c. The method 30 includes assembling the reconstructed frames for the two or more sequential frames into a decoded video sequence, as indicated at block 34. The decoded video sequence may be displayed, for example, using the user interface 22 of the monitoring station 20.

Figure 4:
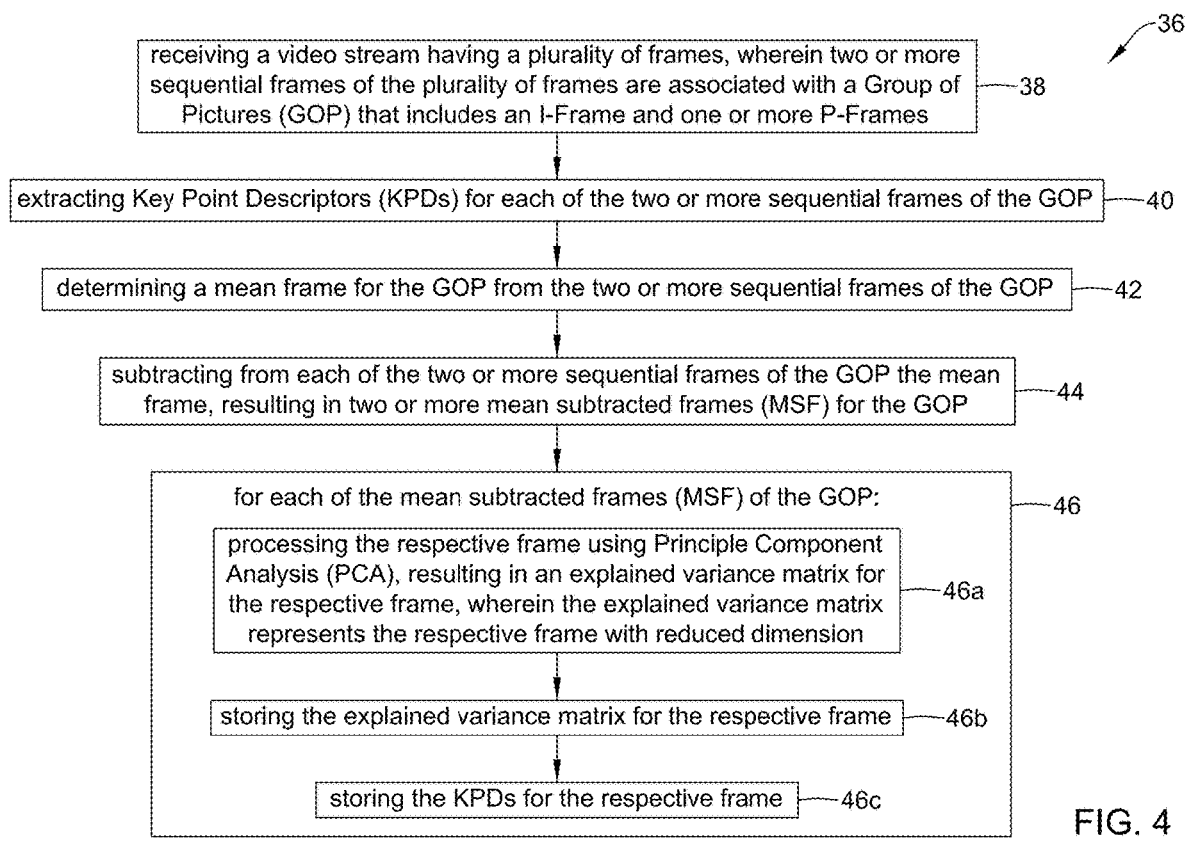
FIG. 4 is a flow diagram showing an illustrative method of compressing a video stream.

FIG. 4 is a flow diagram showing an illustrative method 36 for compressing a video stream. The method 36 includes receiving a video stream having a plurality of frames, wherein two or more sequential frames of the plurality of frames are associated with a Group of Pictures (GOP) that includes an I-Frame and one or more P-Frames, as indicated at block 38. Key Point Descriptors (KPDs) are extracted for each of the two or more sequential frames of the GOP, as indicated at block 40. A mean frame for the GOP is determined from the two or more sequential frames of the GOP, as indicated at block 42.

The mean frame is subtracted from each of the two or more sequential frames of the GOP, resulting in two or more mean subtracted frames (MSF) for the GOP, as indicated at block 44. For each of the mean subtracted frames (MSF) of the GOP, a number of steps are carried out, as indicated at block 46. The number of steps include processing the respective frame using Principle Component Analysis (PCA), resulting in an explained variance matrix for the respective frame, wherein the explained variance matrix represents the respective frame with reduced dimensions, as indicated at block 46a. In some instances, each of the respective frames is processed using Principle Component Analysis (PCA) to produce an intermediate explained variance matrix, followed by processing the intermediate explained variance matrix using vector quantization to produce the explained variance matrix for the frame. The number of steps include storing the explained variance matrix for the respective frame, as indicated at block 46b. The number of steps include storing the KPDs for the respective frame, as indicated at block 46c.

In some instances, the method 36 may further include decoding (e.g. uncompressing) each of the two or more sequential frames of the GOP. Decoding may include retrieving the explained variance matrix for the respective frame and the KPDs for the respective frame. Decoding may include performing an inverse PCA transform to the explained variance matrix of the respective frame to produce a respective reconstructed frame. Decoding may include adding the respective reconstructed frame to the mean frame of the GOP to result in a reconstructed original frame. Decoding may include merging the KPDs associated with the respective frame with the respective reconstructed original frame. Decoding may include assembling the reconstructed original frames into a decoded video sequence.

In some instances, the method 36 may further include transmitting the explained variance matrix and the KPDs for the respective frame to a storage device over a network. In some instances, the method may include retrieving the explained variance matrix for the respective frame and the KPDs for the respective frame from the storage device to decode the respective frame.

Figure 5A:
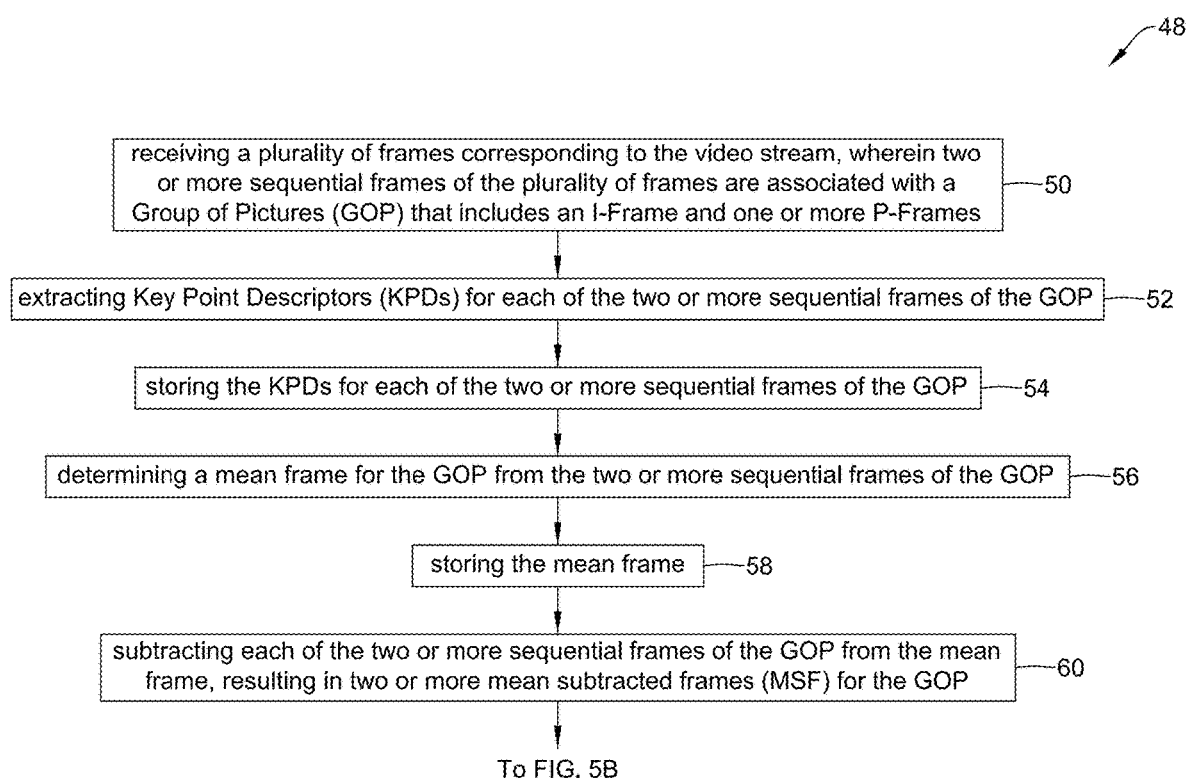
FIGS. 5A and 5B are flow diagrams that together show an illustrative method of compressing a video stream.
Figure 5B:
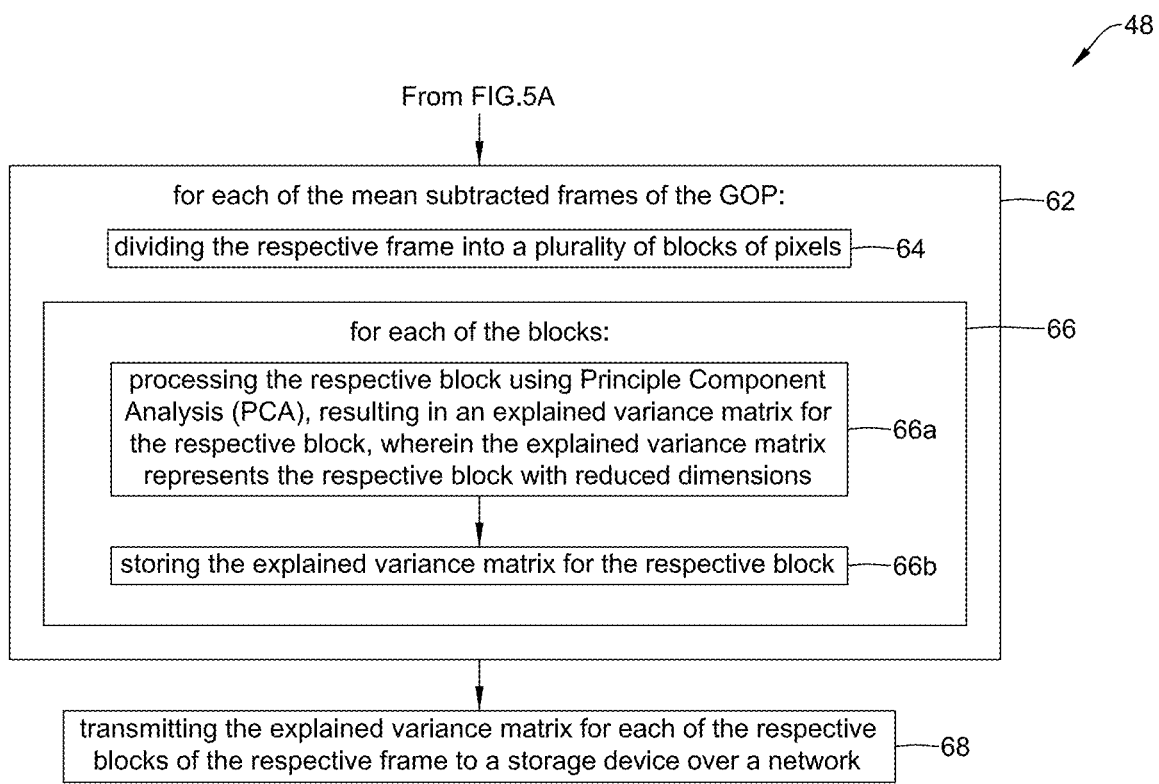

FIGS. 5A and 5B are flow diagrams that together show an illustrative method 48 for compressing a video stream. The method 48 includes receiving a plurality of frames corresponding to the video stream, wherein two or more sequential frames of the plurality of frames are associated with a Group of Pictures (GOP) that includes an I-Frame and one or more P-Frames, as indicated at block 50. Key Point Descriptors (KPDs) are extracted for each of the two or more sequential frames of the GOP, as indicated at block 52. The KPDs for each of the two or more sequential frames of the GOP are stored, as indicated at block 54.

A mean frame for the GOP is determined from the two or more sequential frames of the GOP, as indicated at block 58. Each of the two or more sequential frames of the GOP are subtracted from the mean frame, resulting in two or more mean subtracted frames (MSF) for the GOP, as indicated at block 60.

The method 48 continues on FIG. 5B with block 62, wherein for each of the mean subtracted frames of the GOP, the respective frame is divided into a plurality of blocks of pixels, as indicated at block 64. For each of the blocks, a number of steps are carried out, as indicated at block 66. The number of steps include processing the respective block using Principle Component Analysis (PCA), resulting in an explained variance matrix for the respective block, wherein the explained variance matrix represents the respective block with reduced dimensions, as indicated at block 66a. The number of steps include storing the explained variance matrix for the respective block 66b. The method 48 includes transmitting the explained variance matrix for each of the respective blocks of the respective frame to a storage device over a network, as indicated at block 68.

In some instances, the method 48 may include sequentially selecting each of the plurality of blocks in a selection order, processing the respective block using Principle Component Analysis (PCA), resulting in an explained variance matrix for the respective block, and storing the explained variance matrix for the respective block, wherein the explained variance matrix represents the respective block with reduced dimensions. In some cases, the selection order may be sequential, random or pseudo-random. In some instances, each of the respective blocks may be processed using Principle Component Analysis (PCA) to produce an intermediate explained variance matrix for the respective block, followed by processing the intermediate explained variance matrix using vector quantization to produce the explained variance matrix for the frame for the respective block.

In some instances, the method 48 may include receiving a dimension variable applicable to the GOP, wherein the Principle Component Analysis (PCA) retains a retained number of principle components for each of the respective blocks based at least in part on the dimension variable. As an example, the dimension variable may be updated by a video compression controller to control the number of principle component that are retained with the others discarded, and thus control an amount of compression that is desired for the GOP.

In some instances, the method 48 may include decoding (e.g. uncompressing) each of the two or more sequential frames of the GOP. Decoding may include retrieving the explained variance matrix for each of the blocks of the respective frame and performing an inverse PCA transform to the explained variance matrix of each of the blocks of the respective frame. Decoding may include merging the transformed explained variance matrices of the blocks of the respective frame to reconstruct the respective frame, adding the mean frame to the respective reconstructed frame to result in a reconstructed original frame, and merging the KPDs associated with the respective frame with the respective reconstructed original frame. Decoding may include assembling the reconstructed original frames into a decoded video sequence.

Figure 6:
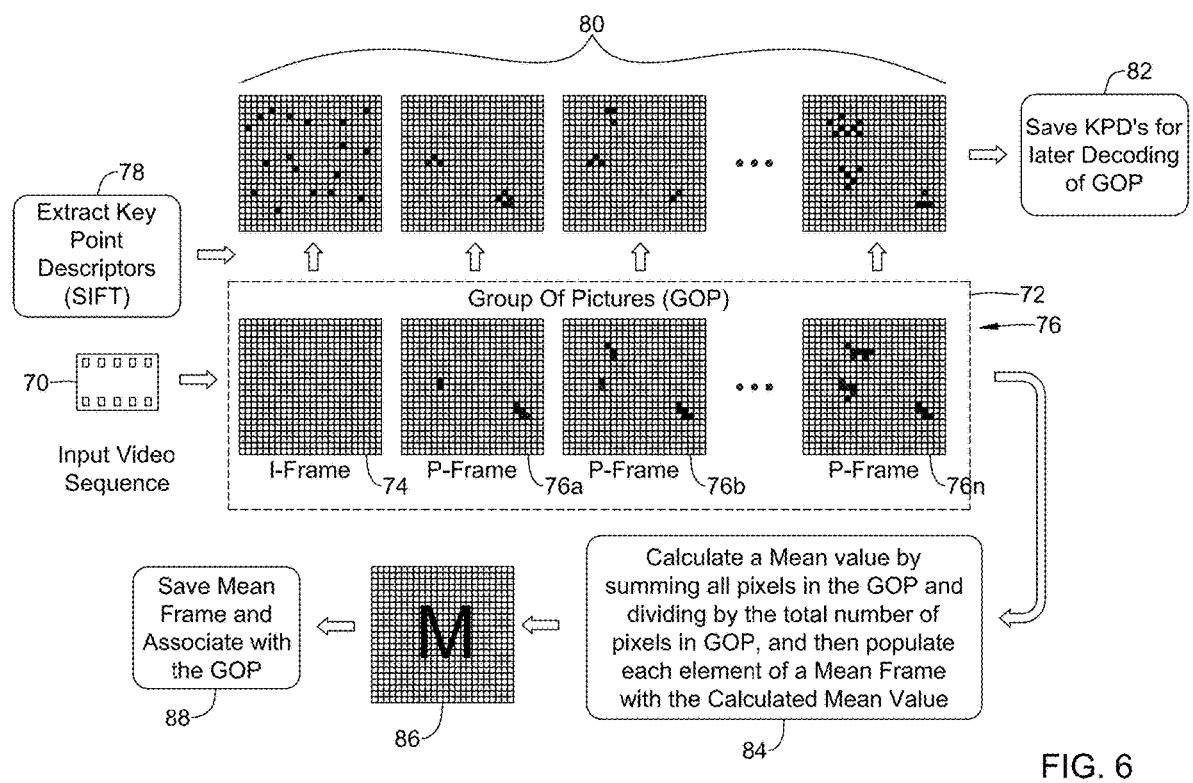
FIG. 6 is a schematic view of a portion of an illustrative encoding process.
Figure 7:
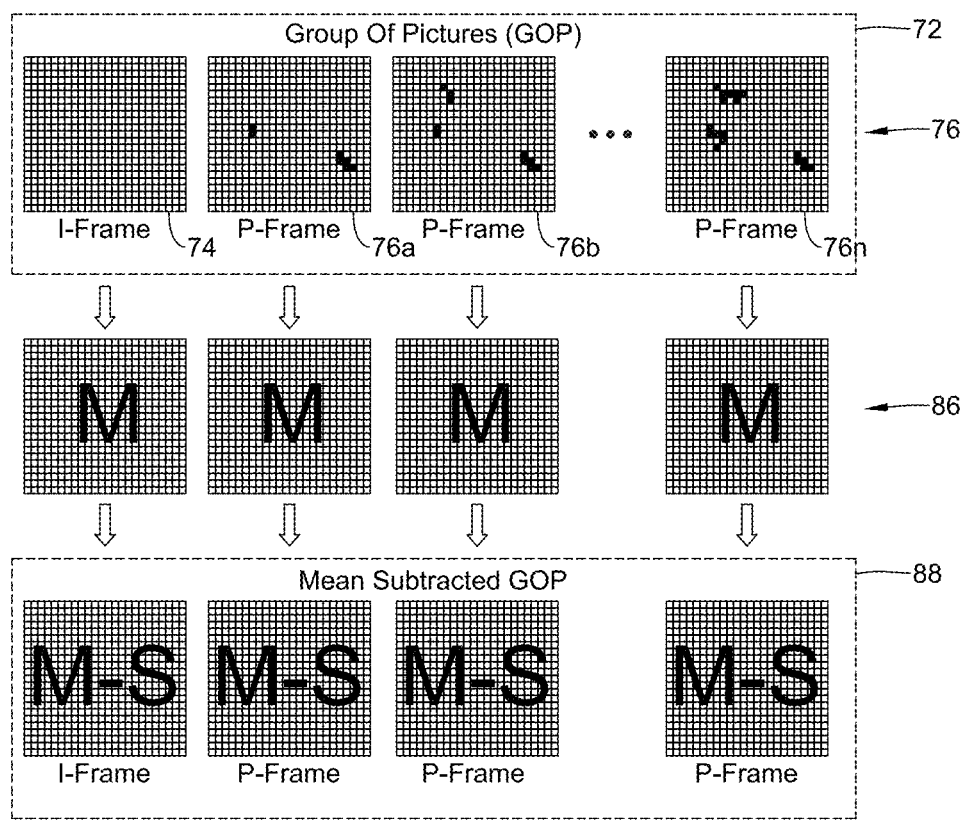
FIG. 7 is a schematic view of a portion of an illustrative encoding process.
Figure 8:
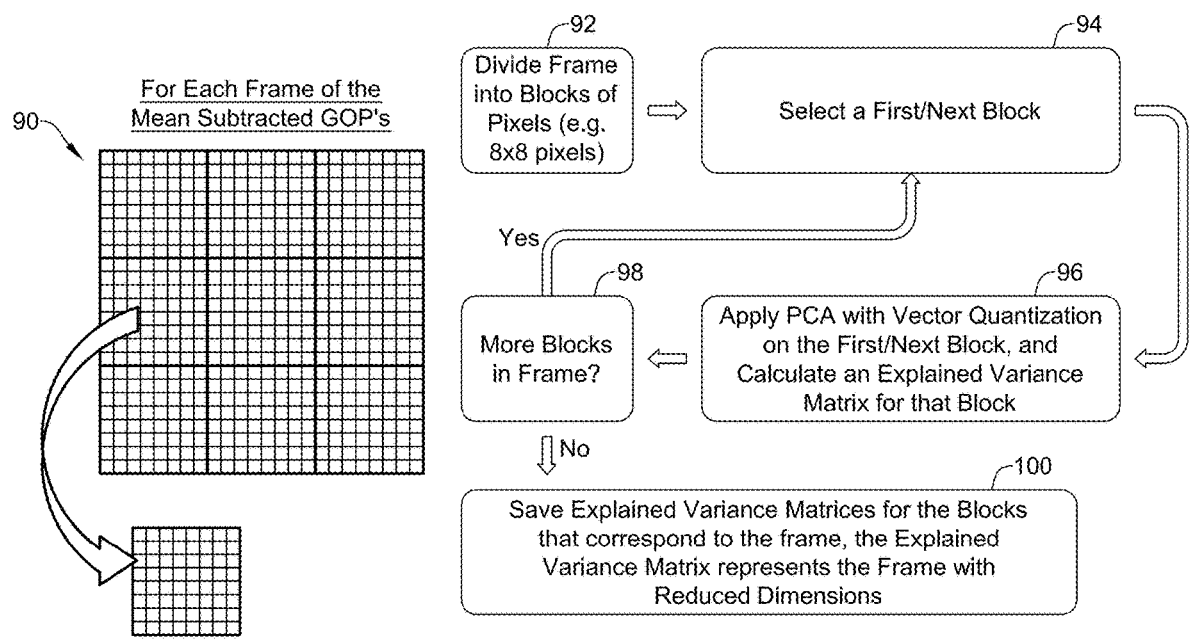
FIG. 8 is a schematic view of a portion of an illustrative encoding process.

FIGS. 6 through 8 are schematic illustrations of an example of performing video compression. As seen in FIG. 6, an input video sequence 70 includes or is divided into a number of GOPs (Group of Pictures) 72, with each GOP 72 (only one is shown) including an I-frame 74 and a number of P-frames 76, individually labeled as 76a, 76b and through 76n. As an example, the GOP 72 may include 15 to 30 frames. In some instances, the I-frame 74 may retain all of the information in the native frame while each of the P-frames 76 may only include the pixels that are different from the corresponding pixels in the I-frame 74. Before proceeding further, KPD (Key Point Descriptors) are extracted using a SIFT algorithm, as indicated at block 78. SIFT refers to a Scale-Invariant Feature Transform. The KPDs corresponding to the I-frame 74 and each of the P-frames 76 are schematically illustrated at 80. As noted, the I-frame 74 includes all of the detail of the native frame, and thus the I-frame 74 may include a greater number of KPDs, relative to the number of KPDs shown corresponding to the P-frame 76. The KPDs are saved for later decoding, as indicated at block 82. It will be appreciated that saving the KPDs are not part of the compression algorithm, and are merely retained for decoding purposes.

A Mean value is calculated, as indicated at block 84. The mean value may be generated by summing all of the pixels of all of the frames in the GOP, and dividing the total by the number of pixels of all frames in the GOP. A Mean Frame 86 is then generated. The Mean Frame 86 may correspond to a matrix that is of the same size as each of the frames in the GOP, with each element of the matrix populated with the mean value. The Mean Frame 86 is saved and is associated with the GOP 72.

Turning now to FIG. 7. The GOP 72 is shown at the top of FIG. 7, including the I-frame 74 and each of the P-frames 76. The Mean Frame 86 is subtracted from each frame of the GOP 72, as indicated at 86, resulting in a plurality of corresponding Mean Subtracted (M-S) Frames 88 that correspond to the GOP 72.

FIG. 8 includes an illustrative frame 90 that may be considered as representing one of the Mean Subtracted Frames 88. The frame 90 may represent a Mean Subtracted I-frame or a Mean Subtracted P-frame, for example. As shown, the frame 90 is divided into 9 blocks that are each 8 pixels by 8 pixels. This is merely illustrative, as the frame 90 will likely have a substantially greater number of pixels, and thus would be divided into a substantially greater number of N×N blocks (e.g. 8×8 blocks). In the example shown, each frame 90 is divided into 8×8 blocks of pixels, as indicated at block 92. In some instances, the blocks may be smaller than 8×8 pixels or may be larger than 8×8 pixels. A block is selected, as indicated at block 94. PCA with Vector Quantization is applied to the pixels in the selected block, and an Explained Variance Matrix is calculated for that block, as indicated at block 96. At a decision block 98, a determination is made as to whether there are more blocks in the frame. If yes, control passes to block 94 and the process continues. If not, control passes to block 100 and the Explained Variance Matrixes for each of the blocks are saved.

Figure 9:
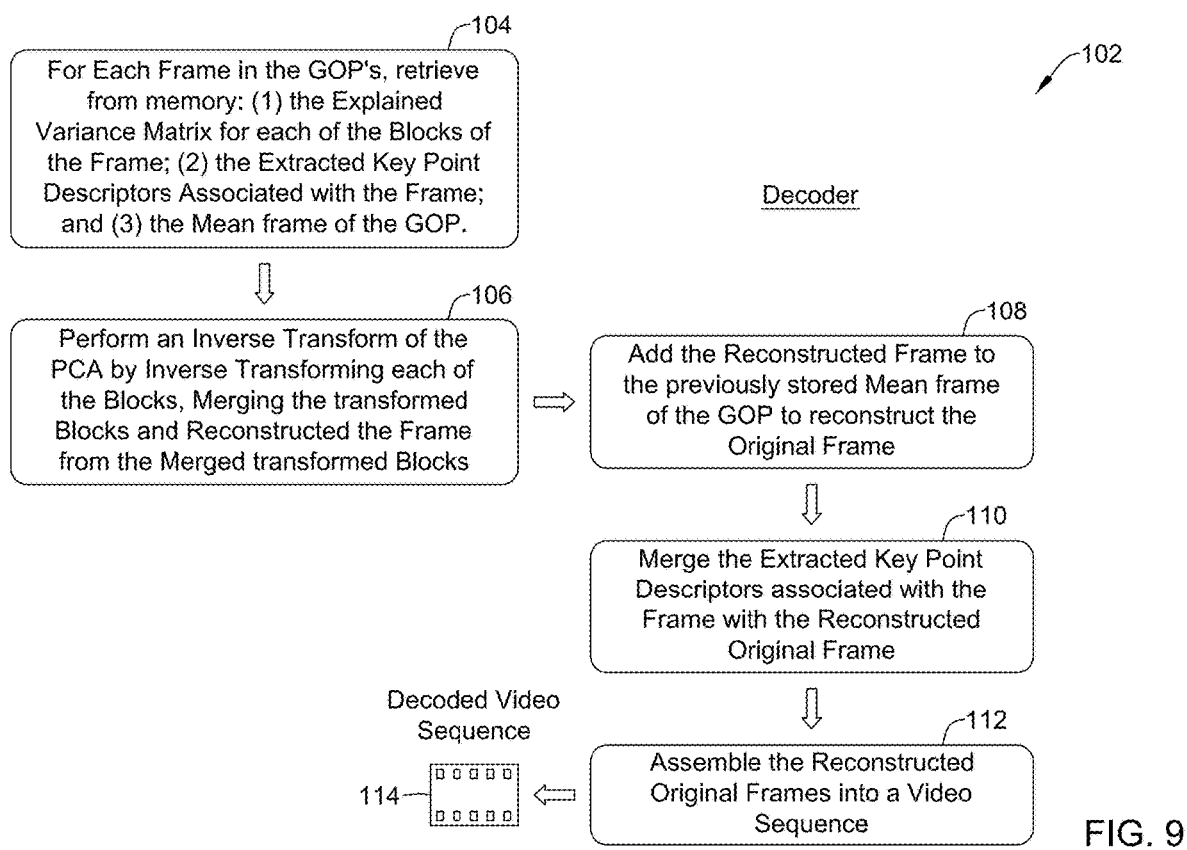
FIG. 9 is a schematic view of a portion of an illustrative decoding process.

FIG. 9 provides an example of a decoding (e.g. uncompressing) process 102 that may be used to regain the original video sequence, or a reasonable facsimile of the original video sequence. For each frame in the GOPs, the Explained Variance Matrix for each block, the Extracted KPDs associated with the frame and the Mean frame of the GOP are retrieved from memory (e.g. from the video recorder 18 of FIG. 1), as indicated at block 104. An Inverse Transform of the PCA is performed on each block, the transformed blocks are merged and the frame is reconstructed, as indicated at block 106. The reconstructed frame is added to the Mean Frame of the GOP in order to reconstruct the original frame, as indicated at block 108. The Extracted KPDs associated with the frame are merged with the reconstructed original frame, as indicated at block 110. The reconstructed original frames are assembled into a video sequence, as indicated at block 112. As a result of the decoding process 102, a decoded (e.g. uncompressed) video sequence 114 is produced.

Figure 10:
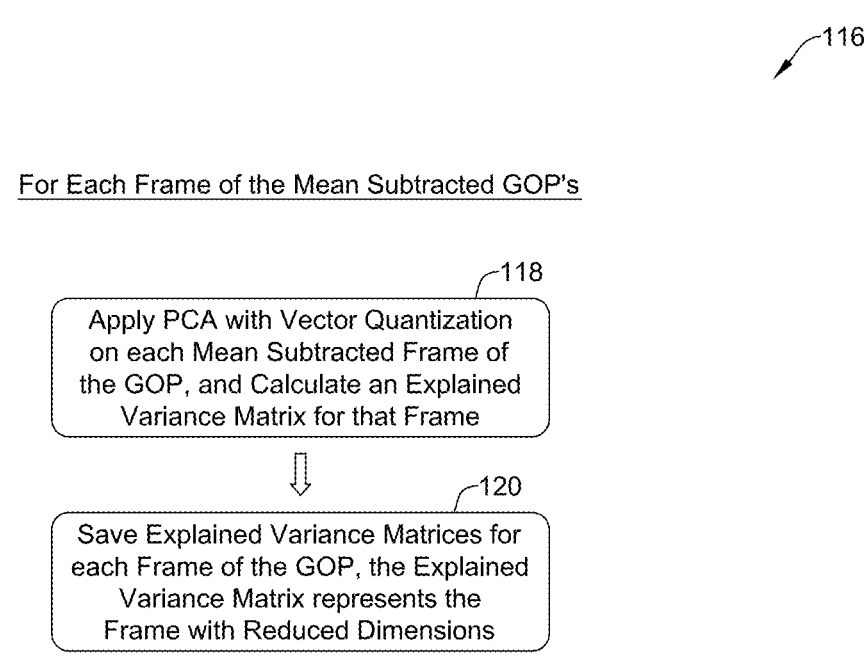
FIG. 10 is a schematic view of a portion of an illustrative encoding process.
Figure 11:
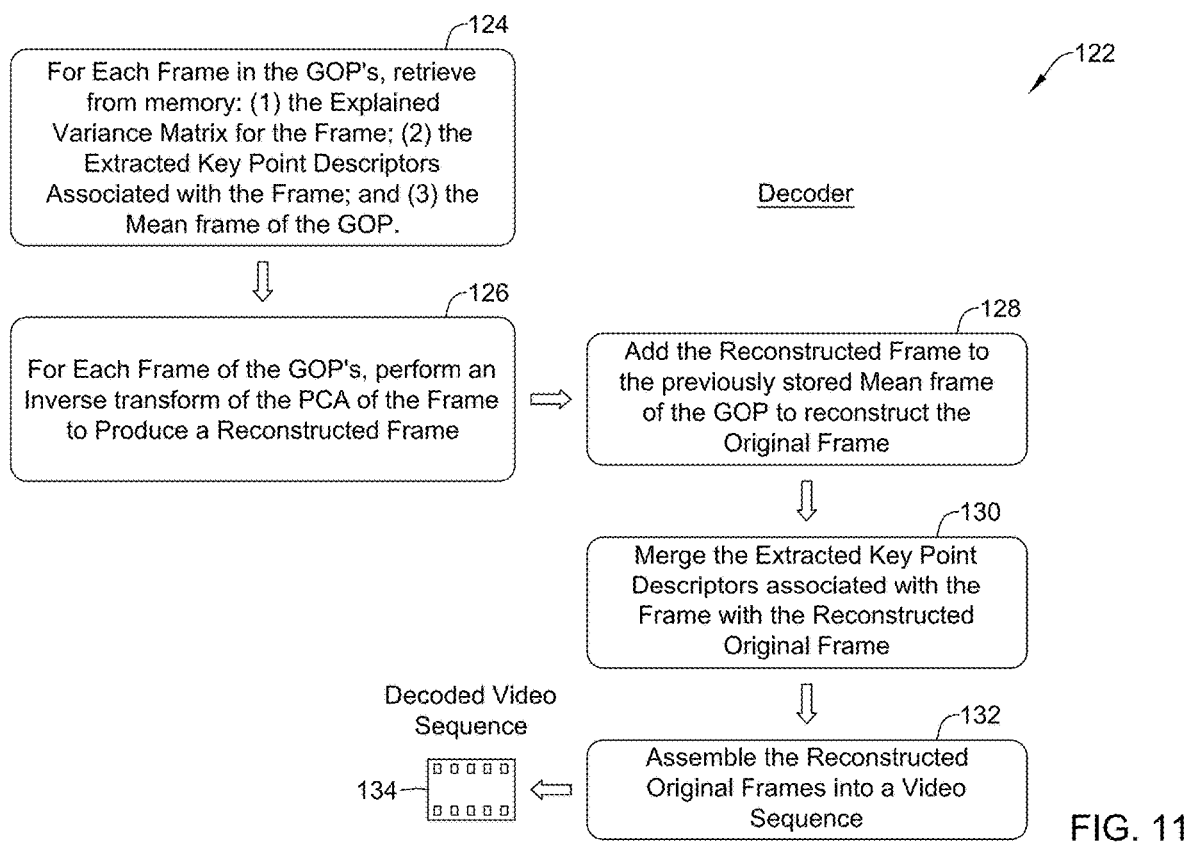
FIG. 11 is a schematic view of a portion of an illustrative decoding process.

FIGS. 10-11 provides an example of an alternative process relative to that shown in FIGS. 8-9. In FIG. 10, PCA with Vector Quantization may be applied to each Main Subtracted Frame of the GOP of FIG. 7, and an Explained Variance Matrix for that frame may be calculated, as indicated at block 118. The Explained Variance Matrix for each frame of the GOP may be saved, as indicated at block 120. It will be appreciated that the Explained Variance Matrix represents the frame with reduced dimensions.

Turning now to FIG. 11, for each frame in the GOPs, the Explained Variance Matrix associated with the frame, the Extracted KPDs associated with the frame and the Mean frame of the GOP are retrieved from memory (e.g. from the video recorder 18 of FIG. 1), as indicated at block 104. An Inverse Transform of the PCA of the frame is performed for each frame of the GOP in order to produce a Reconstructed Frame, as indicated at block 126. The Reconstructed Frame is added to the previously stored Mean Frame of the GOP, as indicated at block 128. The Extracted KPDs associated with the frame are merged with the Reconstructed Original Frame, as indicated at block 130. The Reconstructed Original Frames are assembled into a video sequence, as indicated at block 132. The result of the process 132 is a decoded video sequence 134.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for compressing a video stream, comprising:
retrieving a plurality of frames corresponding to the video stream;
for each of two or more sequential frames of the plurality of frames of the video stream:
extracting Key Point Descriptors (KPDs) for the respective frame;
processing the respective frame using Principle Component Analysis (PCA) followed by vector quantization, resulting in a quantized explained variance matrix for the respective frame;
storing the quantized explained variance matrix for the respective frame, the quantized explained variance matrix represents the respective frame with reduced dimensions; and
storing the KPDs for the respective frame.

2. The method of claim 1, comprising decoding each of the two or more sequential frames of the plurality of frames by:
for each of two or more sequential frames:
retrieving the quantized explained variance matrix for the respective frame and the KPDs for the respective frame;
performing an inverse PCA transform to the quantized explained variance matrix of the respective frame to produce a respective reconstructed frame;
merging the KPDs associated with the respective frame with the respective reconstructed frame; and
assembling the reconstructed frames for the two or more sequential frames into a decoded video sequence.

3. The method of claim 1, wherein the respective frame is processed using Principle Component Analysis (PCA) to produce an intermediate explained variance matrix, followed by processing the intermediate explained variance matrix using vector quantization to produce the quantized explained variance matrix for the frame.

4. The method of claim 1, wherein the two or more sequential frames comprise a Group of Pictures (GOP) that includes an I-Frame and one or more P-Frames.

5. The method of claim 4, comprising extracting the Key Point Descriptors (KPDs) for each of the I-Frame and each of the P-Frames of the GOP.

6. The method of claim 5, comprising processing each of the I-Frame and each of the P-Frames of the GOP using Principle Component Analysis (PCA) followed by vector quantization, resulting in a quantized explained variance matrix for the respective frame.

7. The method of claim 1, wherein each of the plurality of frames corresponds to a mean subtracted frame (MSF), wherein the mean subtracted frame (MSF) represents an original frame of the video stream with a mean value subtracted from each pixel of the original frame.

8. A method for compressing a video stream, comprising:
receiving a video stream having a plurality of frames, wherein two or more sequential frames of the plurality of frames are associated with a Group of Pictures (GOP) that includes an I-Frame and one or more P-Frames;
extracting Key Point Descriptors (KPDs) for each of the two or more sequential frames of the GOP;
determining a mean frame for the GOP from the two or more sequential frames of the GOP;
subtracting from each of the two or more sequential frames of the GOP the mean frame, resulting in two or more mean subtracted frames (MSF) for the GOP;
for each of the mean subtracted frames (MSF) of the GOP:
processing the respective frame using Principle Component Analysis (PCA) followed by vector quantization, resulting in a quantized explained variance matrix for the respective frame, wherein the quantized explained variance matrix represents the respective frame with reduced dimensions;
storing the quantized explained variance matrix for the respective frame; and
storing the KPDs for the respective frame.

9. The method of claim 8 comprising decoding each of the two or more sequential frames of the GOP by:
retrieving the quantized explained variance matrix for the respective frame and the KPDs for the respective frame;
performing an inverse PCA transform to the quantized explained variance matrix of the respective frame to produce a respective reconstructed frame;
adding the respective reconstructed frame to the mean frame of the GOP to result in a reconstructed original frame;
merging the KPDs associated with the respective frame with the respective reconstructed original frame; and
assembly the reconstructed original frames into a decoded video sequence.

10. The method of claim 9, comprising transmitting the quantized explained variance matrix and the KPDs for the respective frame to a storage device over a network.

11. The method of claim 10, comprising retrieving the quantized explained variance matrix for the respective frame and the KPDs for the respective frame from the storage device to decode the respective frame.

12. A method for compressing a video stream, comprising:
receiving a plurality of frames corresponding to the video stream, wherein two or more sequential frames of the plurality of frames are associated with a Group of Pictures (GOP) that includes an I-Frame and one or more P-Frames;
extracting Key Point Descriptors (KPDs) for each of the two or more sequential frames of the GOP;
storing the KPDs for each of the two or more sequential frames of the GOP;
determining a mean frame for the GOP from the two or more sequential frames of the GOP;
storing the mean frame;
subtracting each of the two or more sequential frames of the GOP from the mean frame, resulting in two or more mean subtracted frames (MSF) for the GOP;
for each of the mean subtracted frames of the GOP:
dividing the respective frame into a plurality of blocks of pixels;
for each of the blocks:
processing the respective block using Principle Component Analysis (PCA) followed by vector quantization, resulting in a quantized explained variance matrix for the respective block, wherein the quantized explained variance matrix represents the respective block with reduced dimensions; and
storing the quantized explained variance matrix for the respective block.

13. The method of claim 12, comprising transmitting the quantized explained variance matrix for each of the respective blocks of the respective frame to a storage device over a network.

14. The method of claim 12, comprising sequentially selecting each of the plurality of blocks in a selection order, and:
- processing the respective block using Principle Component Analysis (PCA) followed by vector quantization, resulting in in a quantized explained variance matrix for the respective block; and
- storing the quantized explained variance matrix for the respective block, the quantized explained variance matrix represents the respective block with reduced dimensions.

15. The method of claim 13, wherein the selection order is sequential, random or pseudo-random.

16. The method of claim 12 comprising decoding each of the two or more sequential frames of the GOP by:
- retrieving the quantized explained variance matrix for each of the blocks of the respective frame;
- performing an inverse PCA transform to the quantized explained variance matrix of each of the blocks of the respective frame;
- merging the transformed quantized explained variance matrices of the blocks of the respective frame to reconstruct the respective frame;
- adding the mean frame to the respective reconstructed frame to result in a reconstructed original frame;
- merging the KPDs associated with the respective frame with the respective reconstructed original frame; and
- assembling the reconstructed original frames into a decoded video sequence.

17. The method of claim 12, comprising:
- receiving a dimension variable applicable to the GOP, wherein the Principle Component Analysis (PCA) retains a retained number of principle components for each of the respective blocks based at least in part on the dimension variable.

18. The method of claim 17, wherein the dimension variable is updated by a video compression controller to control an amount of compression that is desired for the GOP.

* * * * *